No. 694,819. Patented Mar. 4, 1902.
R. H. AVERY, Dec'd.
F. R. AVERY, Administrator.
CULTIVATOR.
(Application filed Nov. 21, 1891.)

(No Model.) 4 Sheets—Sheet 1.

Witnesses Inventor
Robert H Avery
By his Attorneys

No. 694,819. Patented Mar. 4, 1902.
R. H. AVERY, Dec'd.
F. R. AVERY, Administrator.
CULTIVATOR.
(Application filed Nov. 21, 1891.)
(No Model.) 4 Sheets—Sheet 3.

No. 694,819. Patented Mar. 4, 1902.
R. H. AVERY, Dec'd.
F. R. AVERY, Administrator.
CULTIVATOR.
(Application filed Nov. 21, 1891.)
(No Model.) 4 Sheets—Sheet 4.

UNITED STATES PATENT OFFICE.

ROBERT H. AVERY, OF PEORIA, ILLINOIS; FREDERIC R. AVERY, ADMINISTRATOR OF SAID ROBERT H. AVERY, DECEASED, ASSIGNOR TO THE AVERY MANUFACTURING COMPANY, OF PEORIA, ILLINOIS, A CORPORATION OF ILLINOIS.

CULTIVATOR.

SPECIFICATION forming part of Letters Patent No. 694,819, dated March 4, 1902.

Application filed November 21, 1891. Serial No. 412,591. (No model.)

*To all whom it may concern:*

Be it known that I, ROBERT H. AVERY, a citizen of the United States, residing at Peoria, in the county of Peoria and State of Illinois, have invented certain new and useful Improvements in Cultivators, of which the following is a specification, reference being had therein to the accompanying drawings.

This invention relates to improvements in cultivators, some of them pertaining to matters characteristic of cultivators which are so constructed that the driver can either ride upon the machine or walk behind it at his option and others pertaining to features of construction and arrangement which can be embodied in any one of the numerous sorts of farm implements of this class.

The matters of novelty will be readily understood from the drawings and the description given below, though I wish it to be understood that I do not limit myself to the exact construction and arrangement of parts which I have selected here for the purpose of illustration.

Fig. 12 is a perspective of the framework of the machine and showing a modification of the lifting-lever and lock. Fig. 13 is a side view of a machine having the parts in Fig. 12. Fig. 14 is an edge view of the shovel-lifting device in Figs. 12 and 13. Fig. 14$^a$ shows part of the shovel-beam. Fig. 15 shows the parts, detached, of the shovel-holder. Fig. 16 is a view on the line $x$ $x$, Fig. 18. Fig. 17 is a side view of parts of the shovel-holder. Fig. 18 is a side view showing other parts thereof.

The machine comprises a main frame, draft devices, supporting-wheels, and shovels or plows, and means for connecting the several said parts.

In the drawings a tongue is shown at A, which in this construction forms part of the draft devices, but which is not essential for all parts of the present invention.

B B are the supporting-wheels. They are mounted on an arched or crank axle C, having the spindle parts $c$, the upper portion $c'$, and the vertical connecting parts $c^2$.

The frame includes a rectangle-like bar D, formed with the upper portion $d$, the vertical parts $d'$, and inwardly-turned arms $d^2$, adapted to serve as journals or spindles for the shovel-beams. The part $d$ of this frame-bar is secured by one or more clips and bolts to the tongue, as at $d^3$.

E E represent longitudinal tie-bars or bracing and connecting rods. Preferably they are formed of angle-iron, and at $e$ each is secured by clip and bolts to the frame-bar D, and at $e'$ it is bolted to the tongue A, it being bent or inclined toward the tongue at a point just in front of the bar D. The axle C is connected to the bars E E at their rear ends, as shown, by means of clip-bearings $e^2$, the latter being sufficiently loose to permit the part $c'$ to rock, as may be desired.

F F are braces or tie-rods bolted at their upper ends to the bars E and at their lower ends engaging with the arms or spindles $d^2$ of bar D. G G are also tie-rods or braces connected at their lower ends to the said spindles $d^2$ and at their upper and forward ends connected to metallic arms or bars H I. Bar H is secured to the under side of the tongue and bar I to the upper side, both being bent downward, so as to have their outer ends brought together. The aforesaid tie-rods G are connected to them at or near their points of junction.

The loose connection between the axle and the main frame is provided in order to permit an adjustment of the weight of the various parts in relation to the axis of the wheels. One of the objects of the present invention is to so construct and arrange the parts of the cultivator that the weight of the parts in front of the axis of the wheels shall at all times be practically balanced by the weight behind it—that is, so that there shall be but little, if any, variation in the downward pressure at the forward end of the tongue under any circumstances, whether the driver be riding or walking and whether the shovels be down or be hung up.

Figure 1:
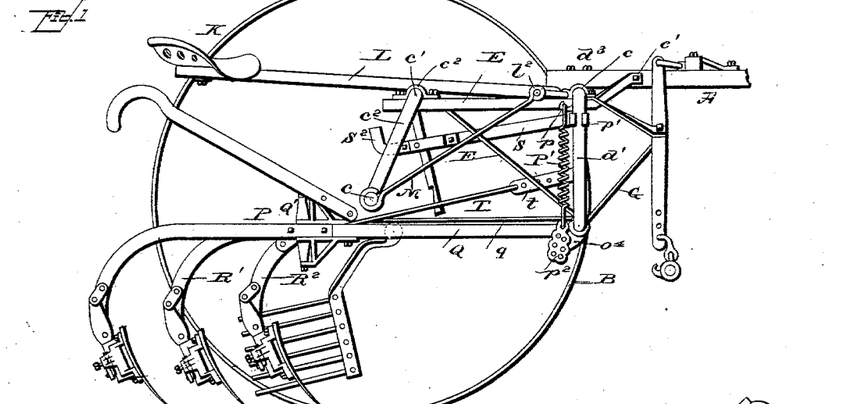
Figure 1 is a side elevation of a cultivator embodying my improvements and showing the parts in the positions occupied when the driver is riding and when the shovels are in their ordinary place vertically.
Figure 2:
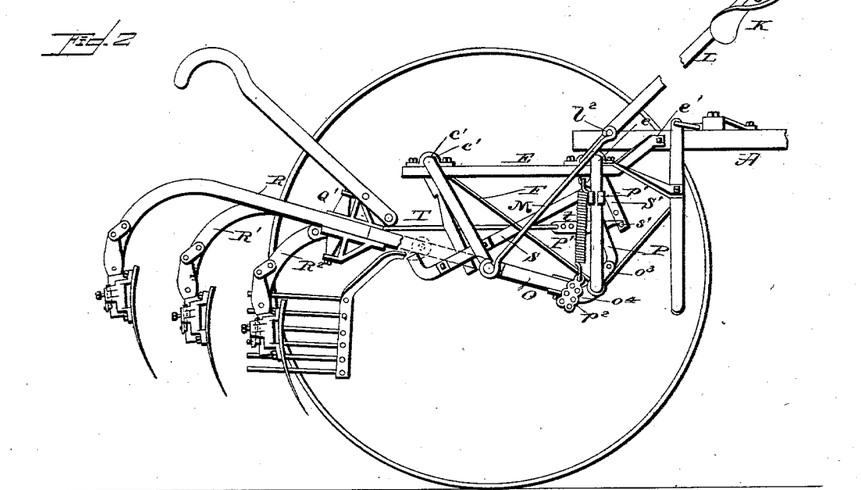
Fig. 2 is a side elevation showing the parts in the positions occupied after they have been adjusted for allowing the driver to walk and also showing the shovel-frame elevated to the place where it hangs when the machine is being transported from one place to another.

By examining Figs. 1 and 2 it will be seen that the arched axle C can be so rocked as to throw the wheel-axis either to a line in front of the axis of the part $c'$ or to a line in rear thereof. I combine with the parts above referred to a lever for throwing the spindles from one of the said positions to the other and connect it suitably with the proper parts for effecting this adjustment.

In order to make the machine compact and simple, I utilize the support for the seat K as the adjusting-lever. It is indicated as a whole by L and is formed of one or more bars of iron. As shown, it is made of a single bar $l$, bent so as to provide the seat-support proper and then having its ends separated to bring them into proximity to the longitudinal frame-bars E. Said ends are provided with journal parts $l'$, mounted in bearings on the frame, and have crank-arms $l^2$. These crank-arms are united by links M with the spindles $c$ of the arched axle. The cranks $l^2$ are so related in position to that of the axle and the links M are of such length that when the driver's seat is down for receiving the driver the wheel-spindles are held in their rearmost position—that is, behind the axis of the part $c'$. At such times it will be seen that the greater part of the weight of the frame and other parts of the machine are in front of the wheel-spindles, and when the driver is in his seat his weight acts to counterbalance that weight, the seat itself being adjustable toward and from the axis to correspond to the driver's weight; but now, if the driver desires to walk, he can preserve the same balancing of the machine if he throws the wheel-spindles into their forward position, (shown in Fig. 2,) and this he can accomplish by means of the aforesaid lever, which is in the present case the seat-support L. It is only necessary to throw it up into the position shown in Fig. 2. After these parts have been so placed the proper amount of the weight of the frame bears downward back of the wheel-axis and balances the parts in front.

The shovel-beams or plow-frames are hinged to the pintles $d^2$ of frame-bar D. The joint or coupling has a tube $n$, preferably angular in section, fitted to arm or spindle $d^2$.

N is a collar adjustably secured to tube $n$ and formed with the sleeve $n'$. The shovel-beam is pivoted by yoke $Q^3$ to the latter and, as will be seen, can vibrate thereon horizontally as well as vibrate vertically with the tube $n$ around spindle $d^2$.

O is a lever formed with eyes $o\ o'$, by which it can be mounted upon the spindle or arm $d^2$, and with the connecting part $o^2$ of which lies under the shovel-beam or under the joint-piece N. The eye part $o$ is formed with arms $o^3\ o^4$, to the former of which a bar P is pivoted and to the latter of which a spring P' is connected. The bar P has a hook $p$ at the upper end, with which the upper end of the spring engages, and at a suitable distance below the upper end there is a clip-guide $p'$, which can be adjusted vertically and secured in any desired position upon the frame. The lower end of the spring is adjustably connected to the arm $o^4$ by means of a perforated plate $p^2$, by which the tension of the spring exerted on the lever O can be regulated. It will be seen that the spring will act to assist in drawing the beam upward not only by its pulling directly up on the arm $o^4$, but also by its drawing down upon the rod P and the arm $o^3$, both arms $o^3$ and $o^4$ acting to cause the lever O to bear with considerable force upward under the shovel-beam. The part $o^2$ of lever O lies in front of the yoke $Q^3$ of the plow-beam and not beneath it, as heretofore, and therefore the yoke is not caused to wear upon and rub said bar, although the latter is constantly bearing against it.

Figure 3:
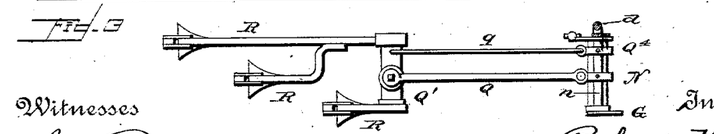
Fig. 3 is a plan view of a plow-beam and its coupling.

The beam or frame Q, the shovels themselves, and the standards may be of any preferred sort. As shown in Figs. 1, 2, and 3, the beam is provided at the rear with a joint Q', hinged to the beam vertically.

$q$ is a connecting-rod pivotally connected to the joint Q' and arranged parallel to the beam. At the front end it is pivotally connected to the coupling by an adjustable collar $Q^4$.

Figures 12, 13, 14, 14A, 15, 16, 17, 18:
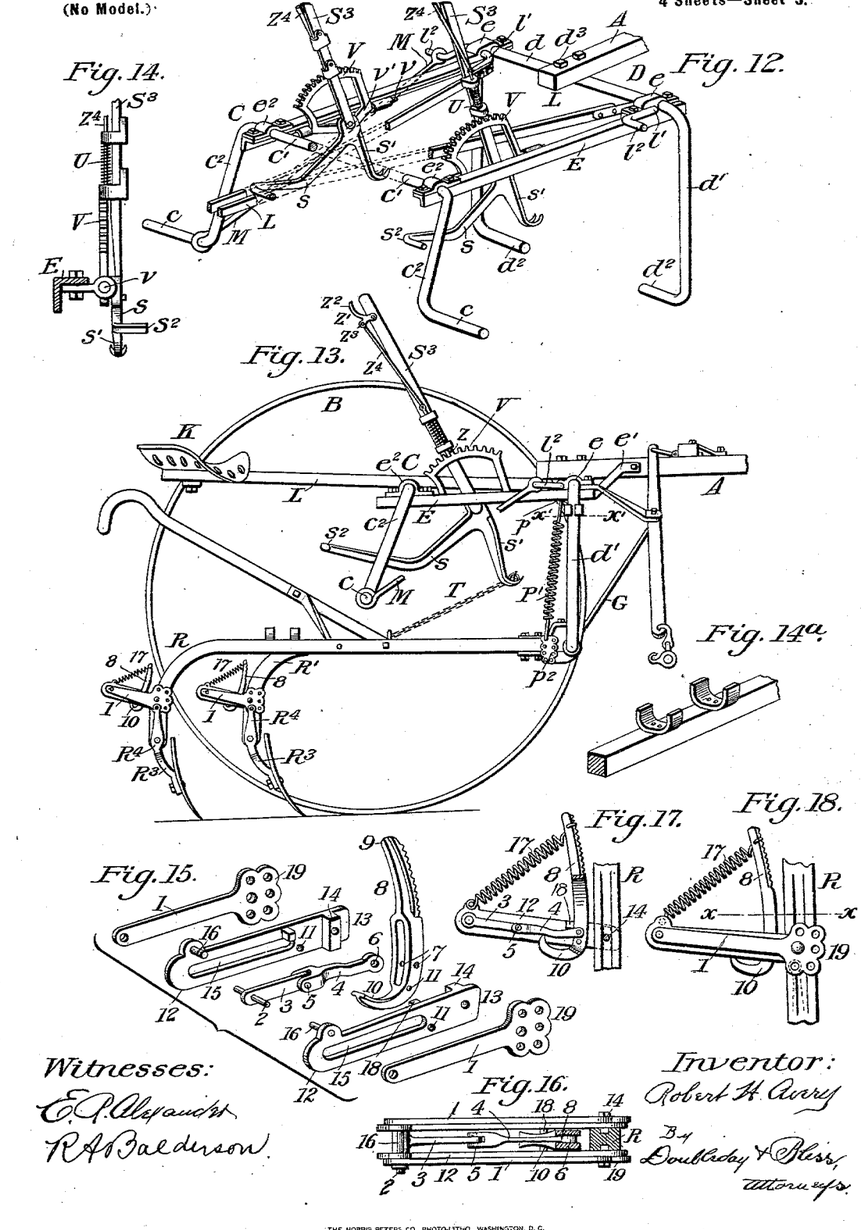
Figure 19:
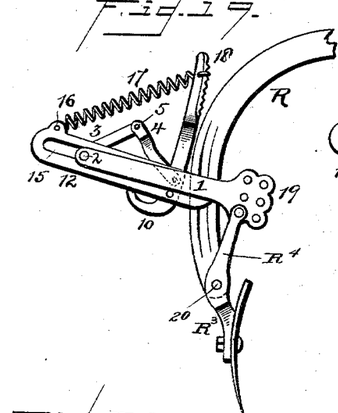
Fig. 19 is a side view of the shovel and its holder, showing the parts in the positions occupied at the time the shovel begins to move backward, as when striking an obstruction.
Figures 20, 30:
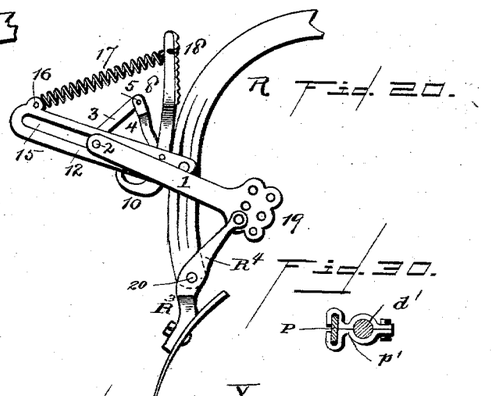
Fig. 20 is a similar view showing the positions of the parts when the shovel has moved still farther to the rear.
Fig. 30 is a section on the line $x'$ $x'$, Fig. 13.
Figures 21, 22, 23, 24, 25, 26, 27, 28, 29:
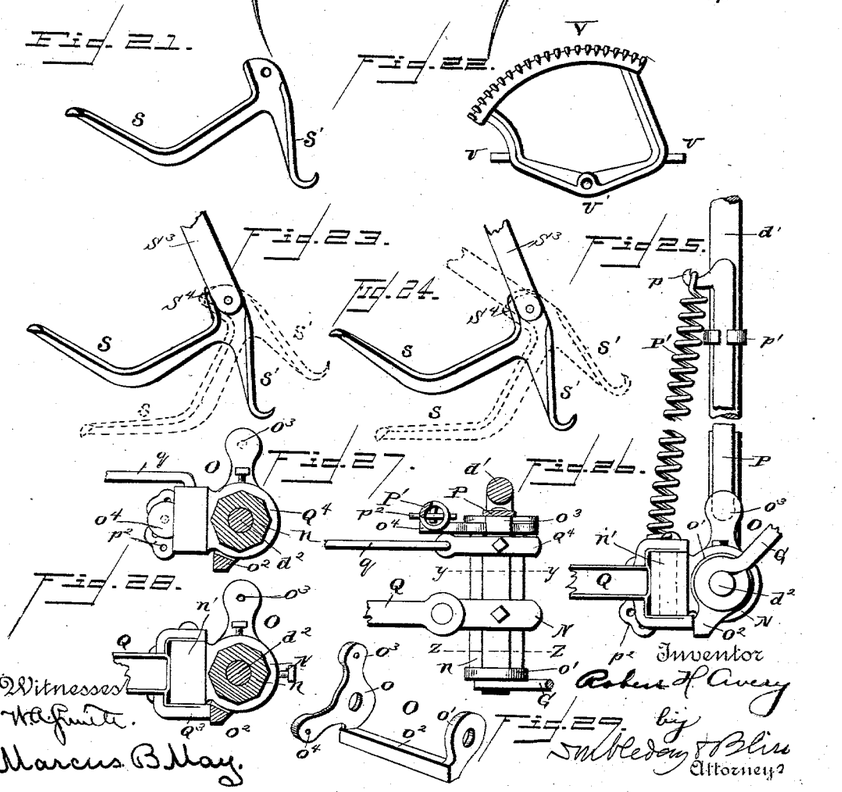
Fig. 21 is a side view of the foot-lever for lifting the shovels.
Fig. 22 is a side view of the lock-ratchet for the lifting-lever.
Figs. 23 and 24 show the relative positions at different times of the hand-lever and foot-lever.
Fig. 25 is an elevation of the coupling for the shovel-beam and the adjacent parts.
Fig. 26 is a plan view of a coupling.
Fig. 27 is a section on the line $y$ $y$, Fig. 26.
Fig. 28 is a section on the line $z$ $z$, Fig. 26.
Fig. 29 is a perspective of the spring lifting-lever.

In Fig. 13 a machine is shown having the beam and the standards rigid from the coupling to the shovels. With a construction like that in Figs. 1, 2, and 3 the shovels can always be held in positions parallel to the coupling.

I have shown two devices for adjusting the plow or shovel gangs vertically and holding them in several positions. In Figs. 1, 2, 4, 7, 8, 9, 10, and 11 this is done as follows: S is a lever, pivoted to bar D and having crank-arm S' with perforations s'. It rocks on bar D, and link T and adjusting-bar t connect it to the plows or shovel-beams. When the shovels are lifted up, link T pushes crank S' forward and lever S swings downward, or, vice versa, if lever S be forced downward, as by the driver's foot, the shovels are lifted up—that is, as the shovel-frame rises lever S falls, and vice versa, and in these figures, 1, 2, 4, 8, &c., an automatic catch or lock is combined with lever S. V is a bar pivoted to the axle and extending downward across lever S. It lies between a pin $u$ and a pivoted catch-piece U on said lever. This pivoted catch terminates at one end in a shoulder at $u'$ and at the other end in a toe $u^5$. $u^2$ is a stop upon which it can fall at times. Bar V has recesses $v'$ of a suitable number on one side, and one or more recesses $v^3$ on the other side. Each recess $v'$ has a shoulder $v^2$, and each recess $v^3$ has a shoulder $v^4$ at one end and a pin or stop at $v^5$ at the other.

Figures 4, 5, 6, 7, 8, 9, 10, 11:
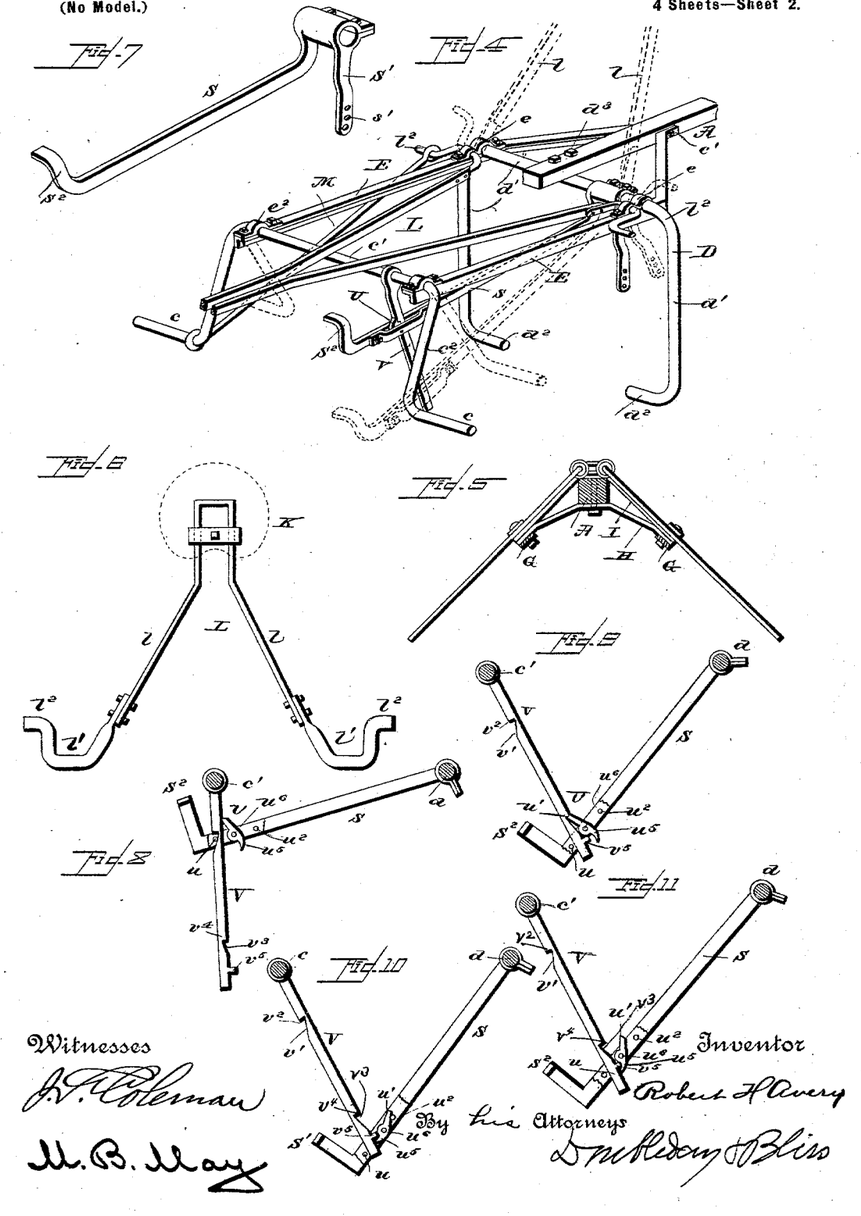
Fig. 4 is a perspective of the framework and some of the attached parts.
Fig. 5 is a section across the tongue and showing some of the draft devices.
Fig. 6 shows the seat-bar or lever detached.
Fig. 7 shows one form of lever for lifting the plows or shovels.
Figs. 8, 9, 10, and 11 show the lifting-lever and lock in the machine in Figs. 1, 2, and 4.

Fig. 8 shows the parts in ordinary working position. When the operator wants the gang to be held up, he, with his hand or foot, causes bar S to drop to the position shown in Fig. 9, whereupon shoulder $u'$ of catch $u$ engages shoulder $v^4$ on bar V. To again lower the gang, he lifts it slightly by depressing lever S, and pin or stop $v^5$ throws catch U forward. (See Fig. 10.) Then he lets the gang down, and bar S rises past shoulder $v^4$, as the part $u'$ is out of the line of said shoulder; but in an instant toe $u^5$ strikes projection $v^5$, (see Fig. 11,) and the catch is brought back against the bar V above the recess $v^3$, whereupon lever S will rise and the plow-gang descend till pin $u$ drops into the recess at $v'$.

Figs. 12, 13, and 14, in connection with Figs. 21, 22, 23, and 24, illustrate another means of lifting and holding the gang. Here lever S and crank-arm S' are connected by a chain T to the gang or shovel beam, and with it is combined a hand-lever S³. The lock V here is a toothed segment, its teeth engaging with a detent $z$ on lever S. It is connected to the frame by its trunnions or pivots $v\ v$, which are hinged in eyepieces secured to the frame. (See Figs. 12, 14, and 22.) Levers S and S³ are pivoted to this locking-bar V at $v'$, and the three parts can rock on the pivots $v$. This allows them to swing out or in to accommodate themselves to the positions of the beams and shovel-gangs as they move laterally. The lever S³ is provided near its rear end with a dog or angle-lever $z'$, which is pivoted at its angle to said lever with its arm $z^2$ in position to be clamped by the hand of the operator. The arm $z^3$ of the dog $z'$ is connected by a rod $z^4$ with the spring-pressed detent or pawl $z$, which latter, as aforesaid, is adapted to engage one notch or another in the swinging-locking-plate V, so as to lock the lever against vertical movement when the cultivator is in use. Ordinarily the detent will be placed in one certain notch in the locking-plate—namely, the one best adapted for average adjustment—and the teeth or notches at a higher point provide means for sustaining the lever in an elevated position when the latter is raised. By examining Fig. 23 it will be seen that the foot-lever can be caused to lift the beam or gang while hand-lever S³ is stationary, and from Fig. 24 it will be seen that when the hand-lever is moved backward or downward the foot-lever will be correspondingly moved, there being a shoulder at S⁴ on the latter on one side of the hand-lever, which insures engagement when said hand-lever is moved, but permits the foot-lever to be moved independently. Arm S' can be connected with the shovels or gang otherwise than by a chain.

The means for adjusting or shifting the wheels constitutes a mechanical device by which power may be advantageously applied by the operator for these purposes, distinguishing my invention in this respect from those constructions in which the shifting of the wheels was effected by a direct application of the hand of the operator to the wheel-carrying spindles or frame.

It will be understood that the devices which adjust the beam vertically or serve to raise it to a non-working position also act to sustain and control the beam in working position, and the part herein referred to as a "lifting lever or device" has, with its connections, the above-mentioned controlling function.

I am aware that various forms of levers, both foot and hand, have been used with corn-planters and other implements or machines having a vertically-vibrating frame on which was supported the levers, together with a supplemental frame in front of that aforesaid, the two frames being hinged together and the lever mechanism being intended to lift the front hinged frame by vibrating the main frame; but I believe myself to be the first to have produced a cultivator of the character herein shown having (as such a cultivator must have for successful use) a relatively stationary main frame with plow-beams or shovel-beams below it and so arranged that they can be adjusted in position without affecting the horizontal position of the main frame.

I am also aware of the fact that cultivators have been made or proposed having lifting-levers for the plow-gangs, which levers were placed above the frame in approximately horizontal positions, and the said lifting-levers have been united to the gang-beams by links and springs and have had combined with them a rigid or stationary segment locking-plate, a power-storing spring bearing on the lever and adapted to lift the beams when the lever was unlocked, a detent for locking the lever, and a dog for actuating said detent so as to release the lifting-lever, as is typically illustrated in Patent No. 285,797, to L. C. Chapin, October 2, 1883; but in such construction the locking-plate did not swing, as does my locking-plate V, to allow for variations in the positions of the shovel-gangs as they vibrate laterally. At the date of this patent it is also known that a swinging locking-plate of substantially the character of mine can be combined with a lifting mechanism similar to that last-above described and typified in the aforesaid Patent No. 285,797, and I therefore do not limit myself to a lever-carrying swinging locking-plate whose axis is horizontal or to a lever approximately vertical normally, as it is well known that the lifting-lever can be more nearly horizontal, as shown in said earlier Patent No. 285,797, and in this connection—that is, with respect to this swinging locking-plate— it will be seen that the power-storing spring P', which assists in lifting the beam, can be constructed and placed in any of the now well-known ways (either to bear on the coupling or to bear on the lever) and still preserve this novel feature of my invention—namely, allowing the lever and locking-plate to swing laterally with the gangs—because of the swinging lever-locking plate V.

I am further aware that cultivators have been heretofore made with a relatively slight adjustment of the wheels longitudinally of the main frame and of the plow-beams to provide for regulating the draft of the shovels and for the varying effect due to drivers of different weights; but the present mechanism belongs to a different class—namely, to that wherein provision is made for compensating for the loss of the entire weight of the driver. There are practically only two operative positions provided for the plow-beams and their frame parts, on the one hand, and the ground-wheels, on the other, one of these being a rear position and the other a forward position, predetermined to correspond to the conditions when the seat contains a driver, on the one hand, and when no driver is riding, on the other hand. In machines of the other sort referred to the adjustment has generally been effected by a two-part or perforated link capable of having its parts connected together in different ways; but the driver has to dismount with considerable inconvenience and disadvantage and loosen the bolt or pin parts and effect a readjustment, though in some cases a limited adjustment of this sort and for the same purpose is attained by means of a link extending backward from the wheel-frame, together with a lever and ratchet segment on the main frame; but in these earlier mechanisms the wheel-frame, including the cross-axle, and the plow-beams were so connected and related that as the wheel-frame was adjusted the plow-beams would be simultaneously elevated or lowered. The present mechanism is distinguishable from those, in that the lever for vertically adjusting the plow-beams, as that at $S^3$, is held stationary vertically while the adjustments are being made and in fixed positions relatively to the part of the frame to which the plow-beam is secured. In either of the two adjustments—that is, whether the wheel-frame is in its forward position or in its rear position—the main frame is at the same height from the ground and the beams are held in the same horizontal positions, so that it is not necessary to readjust the beams by the lifting devices after each adjustment of the frames forward and back. In this connection I desire it to be understood that while I have herein generally referred to the wheels or the wheel-frame or the wheel-spindles as being the part or parts which are adjusted longitudinally of the main frame or of the plow-beams I use such terms relatively, for it will be seen that the plow-beams and the frame to which they are attached may be regarded as being adjustable backward and forward relatively to the wheel-frame. Should the wheels be held fixed peripherally, the other parts can be adjusted forward or backward. Nor do I wish all of the matters of invention to be limited to the fact that the wheel-frame has a vibrating or rocking motion, as at the date of this patent it is understood that well-known substitutes in construction and relation can be employed in this respect if the wheels can be brought from a position relatively close to the front ends of the beams, where they are situated when a driver is walking, to a position considerably in rear thereof, to be occupied when he is riding.

By having the plow-frame (such as at D) arranged to provide a beam-support on the inner sides of its vertical bars and a wheel-frame with wheel-supports on the outer sides of its vertical bars ample provision is secured for bringing the wheel-hubs toward the transverse planes of the beam-couplings without causing any of the parts to interfere and without interfering with the requisite lateral horizontal play of the beams. Another advantage incident to the present construction lies in this: that the depending beam-support is held fixedly vertically relatively to the draft-frame and extends downward to lines relatively near the ground, for I can not only apply thereto beams of the common sort, but, particularly, can, for the first time, so far as I am aware, employ springs to assist in lifting up the beams, these being interposed between the beams and the plow-frame. Though I do not wish all of the features of the invention limited to this construction of beams and plow-frames, as they can be also employed where beams of the other character are used— namely, those which are curved or extended upward to points near the draft-frame or main frame.

When use is made of a lever for adjusting the plow-frame and the wheel-frame in the way herein provided, it will be seen that it assists to some extent in automatically carrying the frames to their positions of adjustment. For instance, if the seat-lever be thrown upward toward the vertical it draws the frames from their forward position or their rear position, as the case may be, to a central position, which may be regarded as neutral, and immediately after passing it the lever will of itself tend to continue the motion to the opposite position, where the stops or rests insure that the frames shall be held against accidental displacement. This shifting-lever is extended approximately horizontally, so as to be readily accessible to the driver when standing on the ground.

In Figs. 15 to 20 I have shown for the shovels the preferred form of holder or device for connecting each shovel with its standard R or R'. The shovel is secured to a pivoted arm $R^3$, shown as forked and having a part $R^4$ on each side of the standard. Arms $R^4$ are adjustably pivoted to bars 1 1, there being perforations at 19 to permit adjustment. At their other ends bars 1 1 are pivoted at 2 to toggle-levers 3 4, jointed together at 5. Toggle 4 has its end 6 secured by a pivot passing through apertures 7 in a lever 8. The latter lever has an upwardly-projecting arm 9 and a toe 10. It is pivoted at 11 between two bars 12 12, which are bolted at 13 to the standard, there being ribs 14 fitted in grooves in the standard to prevent twisting or turning. These bars 12 are slotted at 15, and through the slots extend the aforesaid pivots 2 for bars 1. At their outer ends there are pins 16 or other equivalent for attaching a spring 17, the upper end of which engages with the end 9 of lever 8, said end being notched for adjusting the spring. At 18 there is a stop to prevent lever 8 from swinging backward. When the parts are in their normal position, the pivot 5 of toggle-levers 3 4 is somewhat below the line joining the pivots at 2 and 6, and said levers are locked down. Now by referring to Figs. 17, 19, and 20 the movements of the parts when the shovel strikes an obstruction will be readily understood. Spring 17 tends to hold lever 8 back at the upper end and keep toggles 3 4 locked; but if the backward strain on the shovel becomes greater than the tension of spring 17 the shovel turns on pivot 20 and pulls bars 1 1 forward. They cause toggles 3 and 4 to push lever 8 forward around pivot 11. As soon as lever 8 begins to thus move its toe 10 bears upward on the toggles till pivot 5 is above the line connecting 2 and 7. Thereupon the toggles are unlocked, bars 1 1 move forward, and the shovel moves to the position in Fig. 20, when it can escape from the obstruction. As soon as the toggles are unlocked spring 17 returns lever 8 to its normal position. After the obstruction has been passed the operator causes the shovel to return to its normal position in any suitable way. With devices of this sort I obviate the necessity of employing break-pins, which have to be constantly renewed, and also provide a positive lock whose force can be accurately regulated.

What I claim is—

1. The combination with the standard and the shovel movable relatively to the standard, of a positive lock for the shovel, a lever for releasing the said lock, and a spring for holding the lever in an inactive position, substantially as set forth.

2. The combination with the shovel-standard and the shovel movable in relation to the standard of a two-part lock for the shovel, a spring arranged substantially as set forth to normally hold the parts of the lock in a locked position, and means supplemental to the shovel for releasing the parts of the lock, as described.

3. The combination with the swinging shovel and the lock therefor, of the spring, and a lever, as at 8, having an arm 10 adapted to bear upon and release the lock, substantially as set forth.

4. The combination with the standard and a shovel movable in relation to the standard, of lock-bars as at 3, 4, connected to the shovel, a lever as at 8 adapted to release the said locking-bars, and a spring which holds the lever in an inactive position, substantially as described.

5. The combination with the standard, and the shovel movable relatively to the standard, of a lever as at 8 pivotally connected to the shovel, locking-bars as at 3, 4, connected to the said lever 8, the spring also connected to said lever, and means supplemental to the shovel for unlocking said bars 3 and 4, substantially as set forth.

6. The combination with the standard and the shovel movable in relation to the standard, of the locking-bars 3, 4, connected to the shovel, the lever 8 pivotally connected to the said levers 3, 4, and adapted to be moved by them, and a spring connected to the lever, and arranged to resist motion of the lever by the said bars 3, 4, substantially as set forth.

7. The combination with the swinging shovel, of the spring, the lever 8, the toggle lock-bars 3, 4, a bar 1 connecting said toggle-bars to the shovel, and means supplemental to the shovel for unlocking said bars 3 and 4, substantially as described.

8. The combination with the standard and the shovel movable in relation to the standard, of the lever 8 pivoted at 11, the bars 3, 4, pivoted together and to lever 8 and having a pivot as at 2 interposed between them and the shovel, the pivot which unites said bars 3 and 4 normally lying below the line connecting the pivot 2 with the pivot that joins said bars 3 and 4 to lever 8, and the spring bearing against said lever, substantially as set forth.

9. The combination with the relatively stationary main frame and the vertically-adjustable shovels below said frame, of a lifting device for the shovels formed in two parts pivotally connected together, one being adjustably locked to the relatively stationary main frame, and the other being loosely supported, whereby it can be utilized at any time for lifting, substantially as set forth.

10. The combination with the relatively stationary main frame and the vertically-adjustable shovels below said frame, of the lifting-lever $S^3$ pivotally connected to said relatively stationary frame, and the lever S pivotally connected to the said lever $S^3$ and connected to the shovels, substantially as set forth.

11. The combination with the shovel-lifting devices, of a lifting-lever, and a transversely-vibrating support for said lever, substantially as set forth.

12. The combination with the relatively stationary main frame and the shovels below the main frame and hinged thereto whereby they can rise and fall under and independently of it, of a vibrating hand-lever pivotally supported on said stationary main frame, and a separate vibrating foot-lever, one of said levers being adapted to move in one direction independently of the other, and one of them having a stop lying in the path of the other, substantially as and for the purpose set forth.

13. The combination with the shovel-lifting devices, of the lever $S^3$, and the locking-bar secured to the main frame by one or more substantially horizontally arranged pivots, substantially as set forth.

14. The combination with the relatively stationary main frame, the draft devices rigid therewith, and the vertically-adjustable shovels thereunder, of the hand-lever pivotally connected to the stationary main frame, and the independently-movable foot-lever pivoted on the same axis as the hand-lever, both said levers for lifting the shovels into a non-working position independently of any movement of the main frame relatively to the draft devices, substantially as set forth.

15. The combination with the shovels, of a lever having an arm within reach of the driver's foot when riding, said lever being connected to the shovels and being arranged to vibrate both longitudinally and transversely of the machine, substantially as set forth.

16. The combination with the relatively stationary main frame, the draft device rigid therewith, and the vertically-adjustable shovels thereunder, of the hand-lever pivotally connected to the stationary main frame, the foot-lever movable independently of the hand-lever, and an arm S' which connects both of said levers to the shovels, substantially as set forth.

17. The combination with the laterally-vibrating shovels, of the foot-lever and the hand-lever both arranged to vibrate in planes transverse of the machine, substantially as set forth.

18. The combination with the vertically-adjustable and laterally-vibrating shovels, of the vibrating lifting-lever $S^3$, and a second lever having the two arms S, S', one projecting rearward to a point within reach of the driver's foot, and the other being connected to the shovels, substantially as set forth.

19. The combination with the relatively stationary main frame, the draft devices rigid therewith, and the laterally-vibrating vertically-adjustable shovels, of a foot-lever for lifting the shovels, a locking-bar for said lever arranged to vibrate transversely of the machine, and means for locking said lever to said bar against motion in one or more directions, substantially as set forth.

20. The combination with the shovel-beams adapted to vibrate laterally, of the lifting devices, and the vibrating lock-bar, substantially as set forth.

21. In a wheeled cultivator, the combination with the hinged plow-beam, of the operating-lever connected thereto, the swinging locking-plate to which said lever is pivoted, means for locking said lever, and a spring acting to assist said lever in raising the plows when the lever is unlocked, substantially as described.

22. In combination with the plow-beams, the lifting-lever, and the detent carried thereby, the swinging locking-plate having a notch therein adapted to be engaged by said detent, a dog adapted to release said detent, and means for sustaining said lever in an elevated position when the latter is raised, substantially as described.

23. In combination with the plow-gangs and the lifting-lever, the power-storing spring assisting the lever in raising the beams when the lever is unlocked, the swinging locking-plate to which said lever is pivoted, the detent, and the dog for actuating said detent so as to release the said lifting-lever, substantially as described.

24. The combination of the main frame, the plow-beam pivotally connected to the frame, the supporting-wheels adjustable longitudinally of the main frame, the mechanical device for adjusting the said wheels, the supplemental lever for adjusting the working position of the plow-beam, and the beam-lifting spring arranged to be approximately inactive when the beam is in working position and efficiently active when it is above the working position, substantially as set forth.

25. In a convertible walking and riding cultivator, having a driver's seat, the combination of the main frame, the plow-beam pivotally connected thereto, the wheel-frame adjustable longitudinally relatively to the plow-beam to either of two positions, the main frame being held at the same height from the ground in both of said two positions, a lever for moving the wheel-frame longitudinally of the plow-beam to either of said two positions, and a lever for vertically adjusting the plow-beam adapted to be held stationary vertically while the said adjustments are being made, substantially as set forth.

26. In a convertible walking and riding cultivator, having a driver's seat, the combination of the main frame, the plow-frame depending from and secured in fixed vertical relations to the main frame, the plow-beam pivotally connected to the plow-frame, the wheel-frame adjustable to either of two operative positions longitudinally of the plow-beam, a lever connected to the plow-beam in rear of its front end for lifting it, a lever for moving the wheel-frame and the plow-beam relatively to each other longitudinally of the machine, and means for holding the lifting-lever in fixed position as to the depending plow-frame when the said longitudinal adjustment is being effected, substantially as set forth.

27. In a convertible walking and riding cultivator, having a driver's seat, the combination of the main frame, the plow-beam pivotally connected thereto, supporting-wheels and wheel-carriers movable from a rear position to a forward position, means for sustaining the rear end of the beam capable of a series of adjustments and adapted while under one adjustment to sustain the beam in the same position irrespective of whether the wheels are in their rear position or in their forward position, and a mechanical device supported by the main frame and connected with both of said wheels for effecting the adjustment of the wheels from the one to the other of the said positions, substantially as set forth.

28. In a convertible walking and riding cultivator, having a driver's seat, the combination of the main frame, the plow-beams, the pivots between the beams and the main frame, the beam-sustaining means on the main frame for holding the rear ends of the beams, the wheels and wheel-carrier adjustable from a rear position to a forward position, means for positively holding the wheels and wheel-carrier in both of said positions alternately to prevent accidental return thereof from either position to the other, and devices for locking the beam-sustaining means relatively to the horizontal planes of the main frame to insure that, in one adjustment of said locking devices, the beams shall be held in the same horizontal positions whether the wheels are in their forward position or rear position, substantially as set forth.

29. In a convertible walking and riding cultivator, having a driver's seat, the combination of the main frame, the plow-beams, the pivots interposed between the beams and the main frame, the supporting-wheels, the simultaneously-vibrating crank-arms for the wheels mounted on an axis and adapted to swing from a plane inclined rearward from the vertical plane of the axis to a plane of substantially equal inclination forward from said vertical plane, a lever connected with both of said wheels for applying power to move the wheels from the rear position to the forward position, means for sustaining the rear end of the plow-beam from the main frame, and devices for holding the said beam-sustaining means in one position irrespective of the positions to which the wheels are adjusted, substantially as set forth.

30. In a convertible walking and riding cultivator, having a driver's seat, the combination of the main frame, the plow-beam pivotally connected to the main frame, ground-wheels and wheel-carriers movable from a rear operative position past a central neutral position to a forward operative position, and a mechanical device substantially as described connected with both of said wheels for moving the wheels from one operative position to the other and adapted to automatically carry the wheels from their central position to either of the aforesaid extreme positions after being brought to the said central position by the application of power.

31. In a convertible walking and riding cultivator, having a driver's seat, the combination of the main frame, the plow-beam pivotally connected thereto, supporting-wheels and wheel-carriers movable from a rear operative position past a central position to a forward operative position, means for sustaining the rear ends of the beams and adapted to be held in one position and therefrom sustain the beam in the same relation to the ground both in the forward position of the wheels and in the rear position of the wheels, and a mechanical device substantially as described connected with both of said wheels for moving the wheels from one position to the other and adapted to automatically carry the wheels from their central position to either of the extreme positions, substantially as set forth.

32. In a convertible walking and riding cultivator, having a driver's seat, the combination of the main frame, the beam, and three beam-sustaining devices interposed between the beam and the main frame, to wit, a pivotal connecting device for the front end of the beam, second, a beam-lifting spring, and, third, a beam-lifting and hand-adjusting device for the rear end of the beam, the ground-wheels and wheel-carriers movable from a rear position to a forward position, and mechanical devices substantially as described, for moving the wheels from one position to the other, and permitting the said three beam-sustaining devices to all occupy the same positions whether the wheels are in their forward position or in their rear position, substantially as set forth.

33. In a convertible walking and riding cultivator, having a driver's seat, the combination of the main frame, the plow-carrying frame depending from the main frame and having plow-spindles turned inward from its vertical bars, and the wheel-carrying frame depending from the main frame, and having spindles turned outward from its vertical bars, mechanical devices for relatively adjusting the wheel-spindles and the plow-spindles toward and from each other, and means 34. In a convertible walking and riding cultivator, having a driver's seat, the combination of a main frame, the tongue rigidly secured to said frame, the depending beam-support rigidly secured to the frame, the shovel-gangs universally jointed to said depending support by fixed couplings, the longitudinally-adjustable wheels, the wheel-supports connected to the main frame, a lever for adjusting the wheels longitudinally, means for adjusting vertically the rear ends of the gangs independently of the position of the main frame, and means for fastening them in different positions vertically, substantially as set forth.

35. In a convertible walking and riding cultivator, having a driver's seat, the combination of the main frame, the tongue rigidly secured thereto, the depending gang-support extending substantially to the axis of the wheels, the shovel-gangs having their beams universally jointed to said depending support by fixed couplings, the arched wheel-axle having the wheels on the vibrating spindles and having the journal part mounted on the main frame at the rear end thereof, and the lever for vibrating the said wheel-spindles, substantially as set forth.

36. In a convertible walking and riding cultivator, having a driver's seat, the combination of the draft-frame, the wheels, the outwardly-turned longitudinally-adjustable wheel-spindles, the inwardly-turned beam-spindles depending from the frame in front of the wheel-spindles, the laterally-vibratable plow-beams hinged to the said spindles, and the upward-inclined braces connected to the wheel-spindles, and adjustably secured to the frame at points above the beam-spindles, substantially as set forth.

37. In a convertible walking and riding cultivator, having a driver's seat, the combination of the main frame, the laterally-vibratable plow-beams, the inwardly-turned hinges or spindles for said beams, the wheels in planes outside of the beam-spindles, the longitudinally-adjustable wheel-supports, and the braces secured to the wheel-supports, and adjustably connected to the frame independently of the beam-spindles, substantially as set forth.

38. In a convertible walking and riding cultivator, having a driver's seat, the combination of the main frame, the wheels supported on said frame, the longitudinally-adjustable wheel-supports, the rigidly-fastened suspenders or depending bars in front of the wheel-supports, the inwardly-turned beam-spindles connected to said suspenders, the plow-beams attached to said inwardly-turned spindles inside of their suspenders or depending bars whereby said beams can be placed near the central longitudinal line of the machine, and the adjustable braces for the wheel-supports, substantially as set forth.

39. In a convertible walking and riding cultivator, having a driver's seat, the combination with the supporting-wheels, the longitudinally-adjustable supports for said wheels, a connecting device between said wheel-spindles and a frame to which the upper part of the arched bar is hinged, of the links M loosely connected to the spindles, a crank-arm $l^2$ connected to the links, the depending support in front of the wheel-spindles, rigid with the main frame and extending to said wheel-spindles, the shovel-gangs secured to said depending support by fixed vertical and horizontal pivots, and a lever for rocking the said crank-arm $l^2$ toward the pivots at the front ends of the plow-gangs to throw more or less of the weight in front of the wheel-spindles, substantially as set forth.

40. The combination of the tongue, the diverging frame-bars E, E, extending back behind the tongue, the transverse bar D secured rigidly to the tongue and to the bars E and having the depending inwardly turned shovel-drawing parts $d^2$ rigid with the tongue, the axle hinged to the bars E, and having outwardly-turned vibrating spindles and the braces F, G, substantially as set forth.

41. In a convertible walking and riding cultivator, having a driver's seat, the combination of the main frame, a beam-support and the wheel-support, said supports movable toward and from each other, the pivoted link in front of the wheel-supports, and the lever connected to the link at points in front of the wheel-support for moving the link and causing it to adjust the two said supports relatively to each other, substantially as set forth.

42. In a convertible walking and riding cultivator, having a drivers's seat, the combination of the main frame, the beam-support, the wheel-support, the link connected to the wheel-support and extending forwardly therefrom, and the lever connected to the link at points in front of the wheel-support, substantially as set forth.

43. In a convertible walking and riding cultivator, having a driver's seat, the combination of the draft-frame, the plow-gangs hinged to the draft-frame, means for suspending the rear ends of said gangs in a non-working position independently of the position of said frame, the longitudinally-adjustable wheels having their axes adapted to both lie in each of several transverse vertical planes, a wheel-adjusting mechanism having a vibratable lever mounted on the frame, and stops independent of said adjusting mechanism for limiting the movements of the wheels, substantially as set forth.

44. In a convertible walking and riding cultivator, having a driver's seat, the combination of two frames movable longitudinally relative to each other, carrying or ground wheels on one of said frames, plow-beams connected with the other of said frames, a bar or frame arranged centrally of the machine between said wheels, extending to the rear of the latter, and pivotally mounted on one of said first-mentioned frames, and a link connecting said bar with the other of said first-mentioned frames, whereby said parts act as a means for moving said frames relatively to each other.

45. In a convertible walking and riding cultivator, having a driver's seat, the combination of the main frame, the wheel-supports extending downward from the main frame, the beam-supports, the beams pivotally connected to said beam-supports at their front ends, the beam-lifting springs interposed between the beam-supports and the beams arranged to bear upward on the front ends of the beams and held bodily in fixed relations to the beams, and their supports, and means for adjusting relatively to each other the wheel-supports and the beam-supports longitudinally of the machine.

46. In a convertible walking and riding cultivator, having a driver's seat, the combination with the shovels or plows, and the draft devices secured thereto, of the supporting-wheels, the spindles for said wheels, and a lever which supports said seat and is adapted to move the wheel-spindles longitudinally of the machine, substantially as set forth.

47. In a convertible walking and riding cultivator, having a driver's seat, the combination of the supporting-wheels, the frame, and the wheel-support adapted to be adjusted longitudinally of the frame, of a movable support for the driver's seat having a crank, and a link connecting said crank with the longitudinally-movable wheel-support, substantially as set forth.

48. In a convertible walking and riding cultivator, the combination of a pivoted arched axle, a main frame, a pivoted seat and longitudinally-movable and pivoted parts connecting the seat and axle, said parts being arranged to be on a dead-center when the seat is at an extreme of movement to lock the parts.

49. In a convertible walking and riding cultivator, having a driver's seat, the combination with the shovels or plows, the frame which supports them, the longitudinally-adjustable supporting-wheels, and the hinged seat-support, of the connecting devices which join the seat-support to said wheels, whereby the motion of the seat-support can be transmitted to the wheel-support, substantially as set forth.

50. In a convertible walking and riding cultivator, the combination of two frames movable longitudinally relative to each other, carrying or ground wheels on one of said frames, plow-beams connected with the other of said frames, beam-raising mechanism also connected with said other frame, and a movable seat having connections with both of said frames acting as a means for moving said frames relative to each other.

51. In a convertible walking and riding cultivator, the combination of the main frame, the plow-gangs pivotally connected thereto, the longitudinally-adjustable wheel-frame, the movable seat, and means connecting the seat and the wheel-frame and adapted both to transmit motion from the seat to the wheel-frame, and to lock the wheel-frame in position after adjustment, substantially as set forth.

52. A spring-trip for cultivators, consisting of the combination of a shovel, a shank or support on which the shovel is supported to yield to an obstruction, toggle-levers, and a spring for holding said shovel in normal working position, and a movable support for the end of one of the toggle-levers adapted to be actuated by the shovel, by the movement of which support the relative positions of the pivots of the toggles are changed to permit the flexion of the toggle.

53. A spring-trip for cultivators, comprising a shank, a shovel pivotally connected with the shank, toggle-joint members connected with the shank and with the shovel, and a spring-actuated device adapted to bear laterally against the toggle transversely of its joint.

54. A spring-trip for cultivators, comprising a shank, a shovel pivotally connected with the shank, toggle-joint members connected with the shank, and with the shovel, and a spring-actuated lever, one arm of which is connected with the spring, and another arm of which engages the toggle and is adapted to move in the direction of movement of the toggle as the latter is flexed to permit the yielding of the shovel.

55. A spring-trip for cultivators consisting of the combination of a shovel, a shank or support, on which the shovel is supported to yield to an obstruction, a spring tending to hold the shovel in normal working position, and means for relieving the spring of tension beyond its normal tension as soon as the shovel has yielded.

56. A spring-trip for cultivators, consisting of the combination of a shovel, a support on which the shovel is supported to yield to an obstruction, a spring tending to hold the shovel in normal working position, and means for allowing the spring to contract as soon as the shovel has yielded, and while the shovel remains in its backward position.

57. A spring-trip for cultivators, consisting of the combination of a shovel, a support, on which the shovel is supported to yield to an obstruction, a spring tending to hold the shovel in normal working position, means for allowing the spring to contract as soon as the shovel has yielded, and a stop for holding said spring at normal tension after the shovel has yielded.

58. The combination with the shovel-beam, and the horizontally-adjustable coupling, of the connecting-link $q$ pivotally connected to the shovel-support at the rear, and pivotally connected to the adjustable coupling at the front end, said coupling being movable independently of the shovel-beam, substantially as set forth.

59. The combination of the shovel-beam pivotally connected to its support at the front end, and pivotally connected to the shovel-standard at its rear end, and the connecting-link $q$ pivotally connected to the shovel-standards at the rear, and the laterally-adjustable holder for said link at the front end of the beam independent of the said beam, substantially as set forth.

60. The combination with the shovel-beam, its horizontal pivot or spindle $d^2$, the standards, and the pivotal connection between the beam and the standards, of the parallel link adjustable laterally independently of the beam, substantially as set forth.

In testimony whereof I affix my signature in presence of two witnesses.

ROBERT H. AVERY.

Witnesses:
G. F. CARSON,
W. S. COE.